United States Patent
Raithel et al.

(10) Patent No.: US 6,910,229 B2
(45) Date of Patent: Jun. 28, 2005

(54) INFLATABLE INSULATION INCORPORATING PRESSURE RELIEF MEANS

(75) Inventors: Ingo Raithel, Bad Aibling (DE); Birgit Schaldecker, Feldkirchen-Westerham (DE); Holger Zoudlik, Kolbermoor (DE)

(73) Assignee: Gore Enterprise Holdings, Inc., Newark, DE (US)

( * ) Notice: Subject to any disclaimer, the term of this patent is extended or adjusted under 35 U.S.C. 154(b) by 603 days.

(21) Appl. No.: 10/010,722

(22) Filed: Dec. 6, 2001

(65) Prior Publication Data

US 2003/0106141 A1 Jun. 12, 2003

(51) Int. Cl.⁷ .............................................. A41D 13/12
(52) U.S. Cl. .......................... 2/456; 2/DIG. 3; 441/106
(58) Field of Search .................... 2/455, 456, 463–465, 2/2.11, 2.14, 69, 69.5, 92, 102, 108, DIG. 3; 441/87, 88, 102, 106, 108

(56) References Cited

U.S. PATENT DOCUMENTS

| | | | | |
|---|---|---|---|---|
| 4,091,482 A | * | 5/1978 | Malcolm ..................... 5/413 R |
| 4,637,074 A | * | 1/1987 | Taheri ............................. 2/456 |
| 4,862,730 A | | 9/1989 | Crosby ........................... 73/38 |
| 4,977,623 A | * | 12/1990 | DeMarco ........................ 2/456 |
| 5,148,002 A | * | 9/1992 | Kuo et al. .................. 219/211 |
| 5,781,936 A | * | 7/1998 | Alaloof .......................... 2/456 |
| 6,796,865 B2 | * | 9/2004 | Raithel et al. .............. 441/106 |

FOREIGN PATENT DOCUMENTS

| | | |
|---|---|---|
| GB | 2317102 A | 3/1998 |
| GB | 2323015 A | 9/1998 |
| WO | WO 01/84989 A1 | 11/2001 |

* cited by examiner

Primary Examiner—Tejash Patel
(74) Attorney, Agent, or Firm—Dianne Burkhard

(57) ABSTRACT

The present invention is an inflatable module which is breathable, i.e. permits the passage of moisture vapor, and which further incorporates a pressure relief means for reducing pressure in the inflated portion should the module be subjected to sudden or excessive stress. In a preferred embodiment of the invention, a pressure relief valve is incorporated as the pressure relief mechanism in the inflatable module.

25 Claims, 2 Drawing Sheets

INFLATABLE INSULATION INCORPORATING PRESSURE RELIEF MEANS

BACKGROUND

1. Field of the Invention

The present invention relates to an inflatable insulation module that is breathable, i.e. permits the passage of moisture vapor. This inventive module can be incorporated in a wide variety of garments such as suits, vests, jackets, trousers, hats, gloves, socks, and boots. It can also be used in sleeping bags and bedcovers. The inventive module allows the wearer to adjust the amount of insulation being provided depending on the environmental conditions experienced or the activities that the wearer is engaging in. The inventive module is also provided with a relief valve means for reducing pressure in the inflated portion should the module be subjected to sudden or excessive stress.

2. Background of the Invention

Inflatable garments are well known in the art. The concept of using an air impermeable water vapor permeable material to form the inflatable portion of an insulating module is also known. U.K. Patent Publication 2,317,102 A describes such a module. The air impermeable, water vapor permeable material taught in that publication is an unsupported elastic material such as a polyurethane. The material must be sufficiently elastic to compensate for the stresses arising as a result of inflation, flexing or impact. In order to have sufficient strength, the material has to have a minimum thickness of 50 microns and is preferably 100–150$\mu$ thick. As a result of using relatively thick membranes, the breathability of the module is acknowledged to be reduced. In some embodiments, both sides of the inflatable cavity are formed from such relatively thick membranes that it further reduces breathability.

U.K. Patent No. Application GB2,323,015A describes a variable thermal insulation material with an inflatable layer created from an envelope of breathable material formed from a laminate arrangement of hydrophilic films that are bonded to microporous substrates. This document prefers the combination of microporous and hydrophilic material sold under the trademark GORE-TEX by W. L. Gore & Associates, Inc. The composite article is arranged so that the inflatable cavity is created by hermetically sealing the hydrophilic materials to each other with the microporous substrate on the outside of the hydrophilic film.

While the invention described in U.K. Patent Application 2,323,015A provides many of the advantages of the present invention in practice, garments have tended to leak or rupture when subject to external stresses such as impact. Improvements to overcome these deficiencies in the prior art are contemplated.

These and other purposes of the present invention will become evident from review of the following specification.

SUMMARY OF THE INVENTION

The present invention improves upon and renders practical the invention described in U.K. Patent Application 2,323,015A, as well as other inflatable breathable modules. A wearer may, as a result of athletic activity or carelessness, fall or bump into inanimate objects that place sudden excess pressure on the module most frequently resulting in the splitting of the seams forming the inflatable cavity thereby rendering the module ineffective for further use. U.S. Patent GB 2,317,012 sought to guard against this problem by using thick unsupported elastic film which, as is acknowledged in that application reduced the breathability of the module.

The current invention provides enhanced breathability while at the same time protecting against seam rupture.

The present invention is an inflatable module having one or more inflatable cavities in the module, wherein the module which is breathable, i.e. permits the passage of moisture vapor, and which further incorporates a pressure relief means for reducing pressure in the inflated portion(s) should the module be subjected to sudden or excessive stress. In a preferred embodiment of the invention, a pressure relief valve is incorporated as the pressure relief mechanism in the inflatable module.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
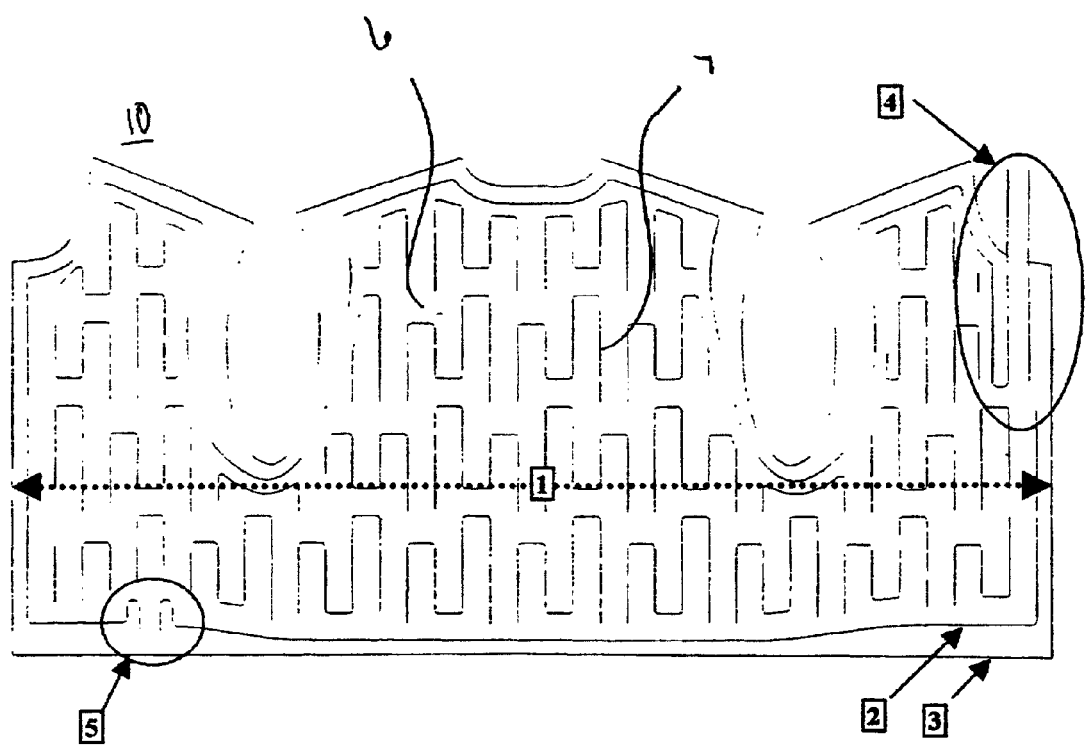
FIG. 1 is a schematic of an inflatable module of the present invention comprising an inflatable insulation jacket or vest insert, the module incorporating a pressure relief valve assembly.

Referring to FIG. 1, there is shown an embodiment of an inflatable module of the present invention comprising an inflatable insert 10 for a garment such as a jacket or vest. The inflatable insert has a width 1 which corresponds to the circumference of the wearer's body when the insert is incorporated into a garment. Sealed perimeter 2 indicates the perimeter of the inflatable cavity 6 formed from the breathable layers. Sealed perimeter 2 may be formed by any appropriate sealing technique, such as adhesive, heat and pressure, high energy welding, etc., thereby forming the sealed inflatable cavity 6. Seal lines 7 indicate further optional seals which may be provided between the breathable fabric layers of the module to create a specific inflation pattern within the inflatable cavity 6. Perimeter 3 is the edge of the inflatable insert 10 and corresponds to the cut fabric laminate edge of the insert.

Suitable breathable fabrics which may be incorporated in the present invention may include single layer materials which are inherently air impermeable and moisture vapor permeable, materials which are coated ot otherwise treated to render them air impermeable and moisture vapor permeable, or laminates of materials which incorporate an air impermeable, moisture vapor permeable layer. Preferred air impermeable, moisture vapor permeable fabrics which may be incorporated in the novel construction of the present invention typically possess moisture vapor transmission rates in the range of greater than 2000 g/m$^2$/24 hours, more preferably greater than 5000 g/m$^2$/24 hours. A particularly preferred laminate for use in the present invention comprises a laminate containing microporous membrane and an air impermeable, moisture vapor permeable layer.

Inflation valve 4, which may also optionally function as a deflation valve for deflating the cavity, is indicated schematically in the Figure and sealably extends into the inflatable cavity 6. Any suitable inflation or inflation/deflation valve may be incorporated into the module of the present invention, provided it allows for inflation of the vest to the desired degree of inflation and, optionally, allows for deflation of the vest, for example, upon opening the valve. A typical inflation valve incorporated in such inflatable modules may be one which is inflatable by mouth, whereby air is blown into the inflatable cavity 6 by the wearer. In this embodiment, the inflation valve 4 is oriented in a location near the wearer's mouth to provide for easy access for inflation while the insert is worn by the wearer.

Pressure relief valve 5 is also schematically depicted in FIG. 1 and is oriented so as to sealably extend into the inflatable cavity. The pressure relief valve 5 may be located in any desired location on the inflatable cavity.

Figure 2:
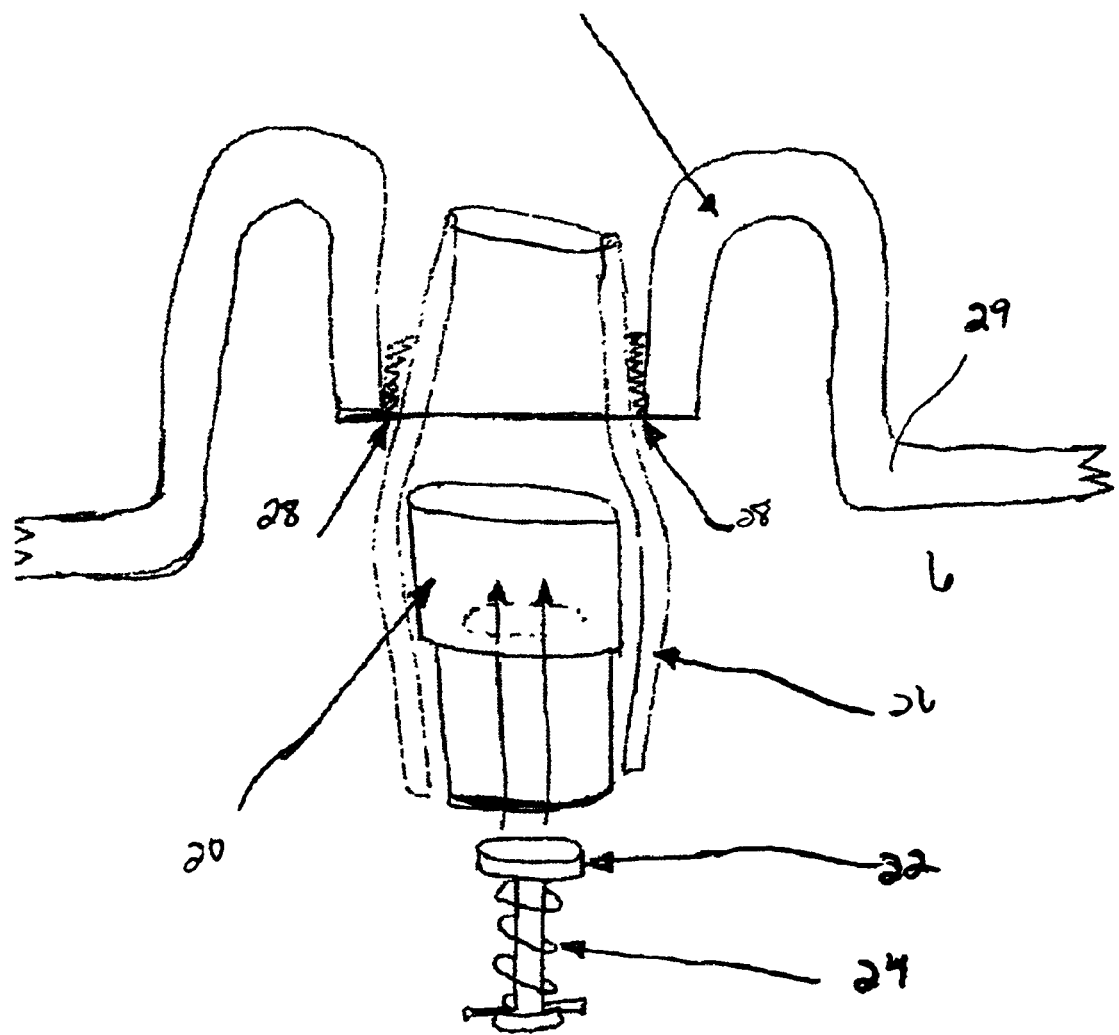
FIG. 2 is a schematic cross-sectional view of a pressure relief valve assembly suitable for use in the present invention.

Referring to FIG. 2, there is shown a detailed schematic cross-section of one suitable pressure relief valve which may be incorporated into the inflatable modules of the present invention. This pressure relief valve 20 includes a poppit 22 having a spring 24 oriented thereon. As mentioned earlier with respect to FIG. 1, the pressure relief valve 20 is incorporated in the inflatable module so that the valve extends into the inflatable cavity 6, as shown. In the embodiment shown in FIG. 2, the relief valve is pressure fit into tube 26, which is adhered by adhesive 28 to the fabric laminate 29.

This pressure relief valve is constructed so that when a relatively higher pressure of a certain psi (pounds per square inch) is imposed on the valve, such as a higher pressure which may result from athletic activity or carelessness, or a fall or bump into inanimate objects placing sudden excess pressure on the module, the spring is compressed and air from within the inflatable cavity is released by the relief valve assembly. However, it would be apparent to an artisan of skill in the art that this pressure relief valve construction is not the only suitable construction which may be adapted for use in the present invention. Moreover, depending on the construction of the module, multiple inflatable cavities may be located in the module, and each inflatable cavity may be provided with inflation means and pressure relief means, as needed, to carry out the desired function of the module.

The pressure relief provided by the pressure relief valve can vary depending on the inflation limitation of the inflatable cavity, the strength of the sealed seams of the inflatable module, the expected sudden stresses that may be imposed on the module, etc. In a preferred embodiment, the pressure relief, or "crack," value (i.e., the pressure at which the pressure relief valve activates) is selected to be in a range of about 0.2 to 3 psi, and more preferably in a range of about 0.4 to 1.5 psi.

The unique combination of a breathable, inflatable module which further incorporates a pressure relief means to protect the module against undesired leaking or rupturing upon being subjected to sudden, excessive external pressure provides advantages which have been heretofore unachievable based on the teachings of the prior art.

Without intending to limit the scope of the present invention, the following example illustrates how the present invention may be made and used.

EXAMPLE

An inflatable module of the present invention was constructed in the following manner.

An inflatable vest or jacket insert was fabricated by first cutting two fabric panels having substantially the geometry shown in FIG. 1. Each fabric panel comprised a laminate of a polyester knit shell layer, a microporous expanded PTFE membrane having an air impermeable, moisture vapor permeable polyurethane layer on the membrane side opposite the shell layer, and an inner polyester knit layer. A polyurethane adhesive bead pattern corresponding substantially to the pattern of the perimeter seal 2 and the seal lines 7 of FIG. 1 was applied between the inner knit textile layers, and sufficient pressure and heat were applied so that the adhesive bead penetrated through the inner polyester knit layers and contacted the air-impermeable, moisture vapor permeable layer of each laminate to form an air-tight seal.

To form an inflation/deflation valve, a fabric tube was formed adjacent the shoulder region of the insert and extending into the inflatable cavity of the insert, as depicted at reference numeral 4 in FIG. 1. The fabric tube was created by the applied parallel adhesive bead lines which sealed the laminates together in a tubular configuration. A silicone tube was then inserted and glued into the fabric tube to form an air-tight seal between the tubes. A plastic inflation valve (Oral Matic Valve 730 ROA, Halkey Roberts, Inc., St. Petersburg, Fla.) was then press fit into the silicone tube, creating an air-tight seal.

To insert the pressure relief valve, a fabric tube was formed adjacent the lower corner region of the insert and extending into the inflatable cavity of the insert, as depicted at reference numeral 5 in FIG. 1. The fabric tube was created by the applied parallel adhesive bead lines which sealed the laminates together in a tubular configuration. A silicone tube was then inserted and glued into the fabric tube to form an air-tight seal between the tubes. A pressure relief valve rated for pressure relief at 0.55 psi pressure (Oral Relief Valve 730 ROARO55, Halkey Roberts, Inc., St. Petersburg, Fla.) was then press fit into the silicone tube, creating an air-tight seal.

The resulting inflatable module was incorporated as a lining insert in a jacket shell.

Test Method

Moisture Vapor Transmission Rate (MVTR)

To determine MVTR, approximately 70 ml. of a solution consisting of 35 parts by weight of potassium acetate and 15 parts by weight of distilled water was placed into a 133 ml. polypropylene cup, having an inside diameter of 6.5 cm. at its mouth. An expanded polytetrafluoroethylene (PTFE) membrane having a minimum MVTR of approximately 85,000 g/m$^2$/24 hrs. as tested by the method described in U.S. Pat. No. 4,862,730 (to Crosby), was heat sealed to the lip of the cup to create a taut, leakproof, microporous barrier containing the solution.

A similar expanded PTFE membrane was mounted to the surface of a water bath. The water bath assembly was controlled at 23° C. plus 0.2'C, utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g. and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The MVTR of the sample was calculated from the weight gain of the cup assembly and was expressed in grams of water per square meter of sample surface area per 24 hours.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An inflatable module comprising:
   at least two fabric layers, each fabric layer comprising an air impermeable, moisture vapor permeable layer, said layers being sealed together by a seal between said layers to form an inflatable cavity;
   a means for inflating said inflatable cavity incorporated into said module; and
   said module further comprising a means for relieving pressure in said inflatable cavity when said cavity is inflated and subjected to external stresses exceeding a predetermined amount.

2. The inflatable module of claim 1, wherein said at least two fabric layers comprises fabric having an air impermeable, moisture vapor permeable coating thereon.

3. The inflatable module of claim 1 in which said means for relieving pressure is a pressure relief valve.

4. The inflatable module of claim 1 wherein said inflating means also functions to release pressure for deflation of the module.

5. The inflatable module of claim 1 comprising a plurality of said inflatable cavities, each of said cavities incorporating means for inflation and means for relieving pressure.

6. The inflatable module of claim 1 in which said laminate has a moisture vapor transmission rate of greater than 5000 g/m$^2$/24 hours.

7. The inflatable module of claim 1, wherein said pressure relief valve relieves pressure when the module is subjected to an external stress creating an internal pressure within the inflatable cavity of 0.4 psi or greater.

8. The inflatable module of claim 1, wherein said pressure relief valve relieves pressure when the module is subjected to an external stress creating an internal pressure within the inflatable cavity of 1.5 psi or greater.

9. The inflatable module of claim 1, wherein said module comprises a breathable insulation insert within a garment.

10. An inflatable module comprising:
    at least two laminates, each laminate comprising an air impermeable, moisture vapor permeable layer, said laminates being sealed together by a seal between said air impermeable, moisture vapor permeable layers to form an inflatable cavity;
    a means for inflating said inflatable cavity incorporated into said module; and
    said module further comprising a means for relieving pressure in said inflatable cavity when said cavity is inflated and subjected to external stresses exceeding a predetermined amount.

11. The inflatable module of claim 10 in which said means for relieving pressure is a pressure relief valve.

12. The inflatable module of claim 10 wherein said inflating means also functions to release pressure for deflation of the module.

13. The inflatable module of claim 10 comprising a plurality of said inflatable cavities, each of said cavities incorporating means for inflation and means for relieving pressure.

14. The inflatable module of claim 10 in which said laminate has a moisture vapor transmission rate of greater than 5000 g/m$^2$/24 hours.

15. The inflatable module of claim 10, wherein said pressure relief valve relieves pressure when the module is subjected to an external stress creating an internal pressure within the inflatable cavity of 0.4 psi or greater.

16. The inflatable module of claim 10, wherein said pressure relief valve relieves pressure when the module is subjected to an external stress creating an internal pressure within the inflatable cavity of 1.5 psi or greater.

17. The inflatable module of claim 10, wherein said module comprises a breathable insulation insert within a garment.

18. An inflatable module comprising:
    at least two laminates comprising a microporous membrane and an air impermeable, moisture vapor permeable layer, said laminates being sealed together by a seal between said air impermeable, moisture vapor permeable layers to form an inflatable cavity;
    a means for inflating said inflatable cavity incorporated into said module; and
    said module further comprising a means for relieving pressure in said inflatable cavity when said cavity is inflated and subjected to external stresses exceeding a predetermined amount.

19. The inflatable module of claim 18 in which said means for relieving pressure is a pressure relief valve.

20. The inflatable module of claim 18 wherein said inflating means also functions to release pressure for deflation of the module.

21. The inflatable module of claim 18 comprising a plurality of said inflatable cavities, each of said cavities incorporating means for inflation and means for relieving pressure.

22. The inflatable module of claim 18 in which said laminate has a moisture vapor transmission rate of greater than 5000 g/m$^2$/24 hours.

23. The inflatable module of claim 18, wherein said pressure relief valve relieves pressure when the module is subjected to an external stress creating an internal pressure within the inflatable cavity of 0.4 psi or greater.

24. The inflatable module of claim 18, wherein said pressure relief valve relieves pressure when the module is subjected to an external stress creating an internal pressure within the inflatable cavity of 1.5 psi or greater.

25. The inflatable module of claim 18, wherein said module comprises a breathable insulation insert within a garment.

* * * * *